United States Patent
Fu

(10) Patent No.: US 9,203,939 B2
(45) Date of Patent: Dec. 1, 2015

(54) DRIVING SYSTEM FOR DRIVING FIRST MODULE TO MOVE WITH RESPECT TO HOUSING AND ELECTRONIC DEVICE THEREWITH

(71) Applicant: Wistron Corporation, New Taipei (TW)

(72) Inventor: Chuan-Cheng Fu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 199 days.

(21) Appl. No.: 14/022,234

(22) Filed: Sep. 10, 2013

(65) Prior Publication Data

US 2015/0024808 A1 Jan. 22, 2015

(30) Foreign Application Priority Data

Jul. 16, 2013 (TW) ............................. 102125437 A

(51) Int. Cl.
*H04M 1/00* (2006.01)
*H04M 1/02* (2006.01)
(52) U.S. Cl.
CPC ........ *H04M 1/0237* (2013.01); *H04M 2250/12* (2013.01)
(58) Field of Classification Search
CPC ... G06F 1/1652; G06F 1/1624; G06F 1/1616; G06F 1/1615; G06F 1/1643; G06F 1/1647; G06F 1/1677; G06F 1/1684; G06F 1/1688; G06F 2200/1614; G06F 3/016; G06F 3/0488; G06F 3/1423; G06F 1/1637; G06F 1/1656; G06F 1/3265; H04M 1/0268; H04M 1/0216; H04M 2250/22; H04M 1/0214; H04M 1/0247; H04M 2250/16

See application file for complete search history.

(56) References Cited

U.S. PATENT DOCUMENTS

2008/0125195 A1* 5/2008 Maenpaa ................... 455/575.3
2011/0095975 A1* 4/2011 Hwang et al. ................. 345/156

FOREIGN PATENT DOCUMENTS

EP 2060967 B1 7/2009
TW 200925960 6/2009

OTHER PUBLICATIONS

Office action mailed on Nov. 24, 2014 for the Taiwan application No. 102125437, filing date: Jul. 16, 2013, p. 2 line 2~26, p. 3~7 and p. 8 line 1~21 Translation.

* cited by examiner

*Primary Examiner* — Golam Sorowar
(74) *Attorney, Agent, or Firm* — Winston Hsu; Scott Margo

(57) ABSTRACT

A driving system includes a sensor, a shape memory alloy member, a processing module and a recovery member. The sensor is installed on a housing, and the shape memory alloy member is connected to a module and the housing. The processing module is coupled to the sensor and the shape memory alloy member. The processing module supplies power to the shape memory alloy member when the processing module receives a sensing signal from the sensor, such that the shape memory alloy member is heated to deform for driving the module to move away from the housing. The recovery member is connected to the housing and for driving the module to get closer to the housing.

20 Claims, 12 Drawing Sheets

DRIVING SYSTEM FOR DRIVING FIRST MODULE TO MOVE WITH RESPECT TO HOUSING AND ELECTRONIC DEVICE THEREWITH

BACKGROUND OF THE INVENTION

1. Field of the Invention

The present invention relates to a driving system and an electronic device therewith, and more particularly, to a driving system for driving a first module to move with respect to a housing and an electronic device therewith.

2. Description of the Prior Art

On the current trend of mobile phone development, a smart phone equipped with a touch panel has become the mainstream in the market. With different habits of users, the smart phone is often required to be equipped with an additional module, such as a keyboard for keying in a phone number, a text, a message and so on. On the other hand, with enhancement of user's visual demands, the appearance unity of the smart phone is getting more and more emphasized. Hence, mechanical designs of the smart phone with the appearance unity and key-in capability have become issues in the industry.

SUMMARY OF THE INVENTION

The present invention provides a driving system for driving a first module to be expanded on a housing or contained in the housing and an electronic device therewith for solving above drawbacks.

According to an embodiment of the present invention, a driving system includes at least one sensor, a first shape memory alloy (SMA) member, a processing module and at least one first recovery member. The at least one sensor is installed on the housing and for generating a first sensing signal. The first SMA member connects the first module and the housing. The processing module is coupled to the at least one sensor and the first SMA member. The processing module supplies power to the first SMA member for heating the first SMA member when receiving the first sensing signal from the at least one sensor, such that the first SMA member deforms to drive the first module to move away from the housing to an expanding position. The at least one first recovery member connects the first module and the housing for driving the first module to move toward the housing so as to be in a containing position.

According to another embodiment of the present invention, the at least one first recovery member is made of SMA material, and the at least one sensor is further for generating a second sensing signal. The processing module supplies power to the at least one first recovery member for heating the at least one first recovery member when receiving the second sensing signal from the at least one sensor, such that the at least one first recovery member deforms and drives the first module to move toward the housing so as to be in the containing position.

According to another embodiment of the present invention, the processing module includes an alloy driving circuit and a control circuit. The alloy driving circuit is coupled to the first SMA member and the at least one first recovery member. The control circuit is coupled to the at least one sensor and the alloy driving circuit. The control circuit controls the alloy driving circuit to supply power to the first SMA member when receiving the first sensing signal from the at least one sensor, and the control circuit controls the alloy driving circuit to supply power to the at least one first recovery member when receiving the second sensing signal from the at least one sensor.

According to another embodiment of the present invention, the at least one first recovery member is a spring-shaped structure.

According to another embodiment of the present invention, the at least one first recovery member is a spring.

According to another embodiment of the present invention, the processing module includes an alloy driving circuit and a control circuit. The alloy driving circuit is coupled to the first SMA member. The control circuit is coupled to the at least one sensor and the alloy driving circuit. The control circuit controls the alloy driving circuit to supply power to the first SMA member when receiving the first sensing signal from the at least one sensor.

According to another embodiment of the present invention, the driving system is further for driving a second module to move relative to the housing. The driving system further includes a second SMA member and at least one second recovery member. The second SMA member connects the second module and the housing, and the processing module supplies power to the second SMA member for heating the second SMA member when receiving the first sensing signal from the at least one sensor such that the second SMA member deforms and drives the second module to move away from the housing so as to be in a using position. The at least one second recovery member connects the second module and the housing for driving the second module to move toward the housing so as to be in a retracting position.

According to another embodiment of the present invention, the at least one first recovery member and the at least one second recovery member are made of SMA material, and the at least one sensor is for generating a second sensing signal. The processing module supplies power to the at least one first recovery member and the at least one second recovery member for heating the at least one first recovery member and the at least one second recovery member when receiving the second sensing signal from the at least one sensor such that the at least one first recovery member deforms and drives the first module to move toward the housing so as to be in the containing position, and the at least one second recovery member deforms and drives the second module to move toward the housing so as to be in the retracting position.

According to another embodiment of the present invention, processing module includes an alloy driving circuit and a control circuit. The alloy driving circuit is coupled to the first SMA member, the second SMA member, the at least one first recovery member and the at least one second recovery member. The control circuit is coupled to the at least one sensor and the alloy driving circuit. The control circuit controls the alloy driving circuit to supply power to the first SMA member and the second SMA member when receiving the first sensing signal from the at least one sensor. The control circuit controls the alloy driving circuit to supply power to the at least one first recovery member and the at least one second recovery member when receiving the second sensing signal from the at least one sensor.

According to another embodiment of the present invention, the at least one first recovery member and the at least one second recovery member are respectively a spring-shaped structure.

According to another embodiment of the present invention, the at least one first recovery member and the at least one second recovery member are respectively a spring.

According to another embodiment of the present invention, the processing module includes an alloy driving circuit and a control circuit. The alloy driving circuit is coupled to the first SMA member and the second SMA member. The control circuit is coupled to the at least one sensor and the alloy driving circuit, and the control circuit controls the alloy driving circuit to supply power to the first SMA member and the second SMA member when receiving the first sensing signal from the at least one sensor.

According to another embodiment of the present invention, an electronic device includes a housing, a first module and a driving system for driving the first module to move relative to the housing. The driving system includes at least one sensor, a first SMA member, a processing module and at least one first recovery member. The at least one sensor is installed on the housing and for generating a first sensing signal. The first SMA member connects the first module and the housing. The processing module is coupled to the at least one sensor and the first SMA member. The processing module supplies power to the first SMA member for heating the first SMA member when receiving the first sensing signal from the at least one sensor, such that the first SMA member deforms to drive the first module to move away from the housing to an expanding position. The at least one first recovery member connects the first module and the housing for driving the first module to move toward the housing so as to be in a containing position.

In summary, since the SMA member of the present invention deforms as being heated, the SMA member of the present invention can utilized for driving a module (e.g. the keyboard module) to be expanded out of the housing of the electronic device. As a result, the user can operate the expanded module. When the module is no longer in use, the present invention further utilizes the recovery member for driving the module to be contained in the housing of the electronic device, so as to keep the appearance unity of the electronic device.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and "installed" and variations thereof herein are used broadly and encompass direct and indirect connections and installations. Accordingly, the drawings and descriptions will be regarded as illustrative in nature and not as restrictive.

Figure 1:
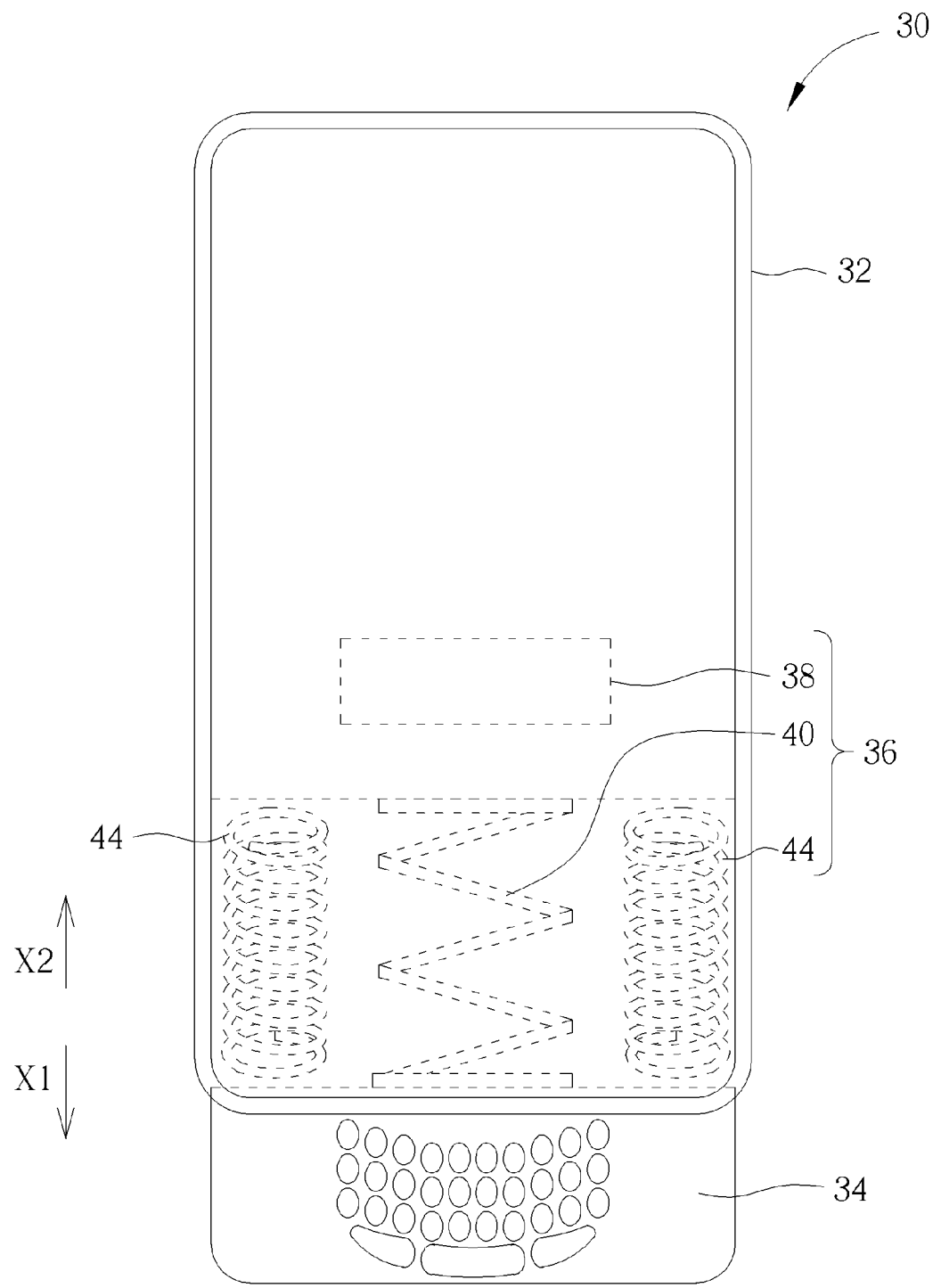
FIG. 1 is a diagram of an electronic device in an expanded status according to a first embodiment of the present invention.
Figure 2:
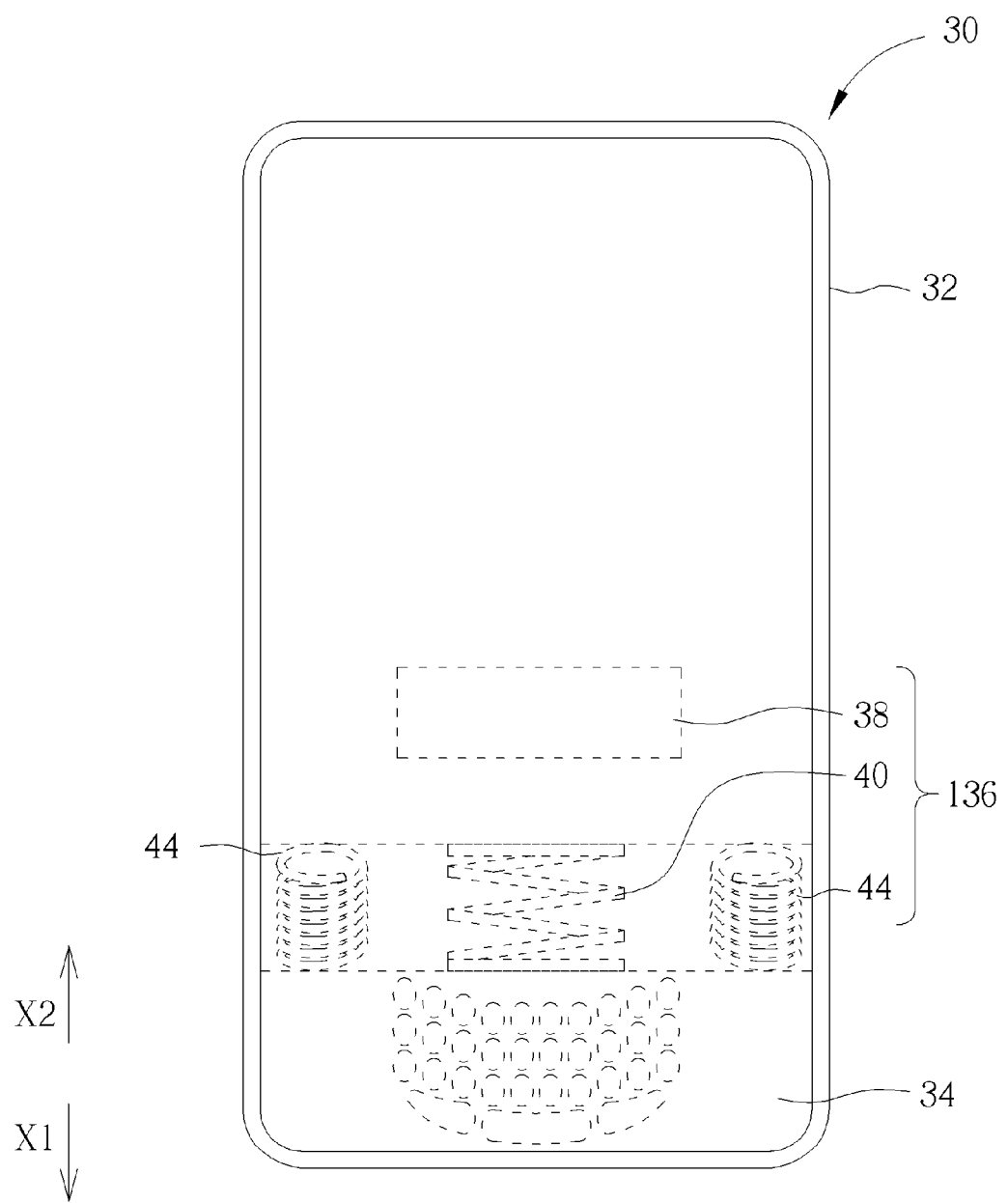
FIG. 2 is a diagram of the electronic device in a contained status according to the first embodiment of the present invention.

Please refer to FIG. 1 and FIG. 2. FIG. 1 is a diagram of an electronic device 30 in an expanded status according to a first embodiment of the present invention. FIG. 2 is a diagram of the electronic device 30 in a contained status according to the first embodiment of the present invention. As shown in FIG. 1 and FIG. 2, the electronic device 30 includes a housing 32, a first module 34 and a driving system 36. The driving system 36 is used for driving the first module 34 to move relative to the housing 32. Accordingly, the first module 34 can move relative to the housing 32 to an expanding position, as shown in FIG. 1, for a user to operate. Alternatively, the first module 34 can move relative to the housing 32 to a containing position, as shown in FIG. 2 for the user to store or carry.

Figure 3:
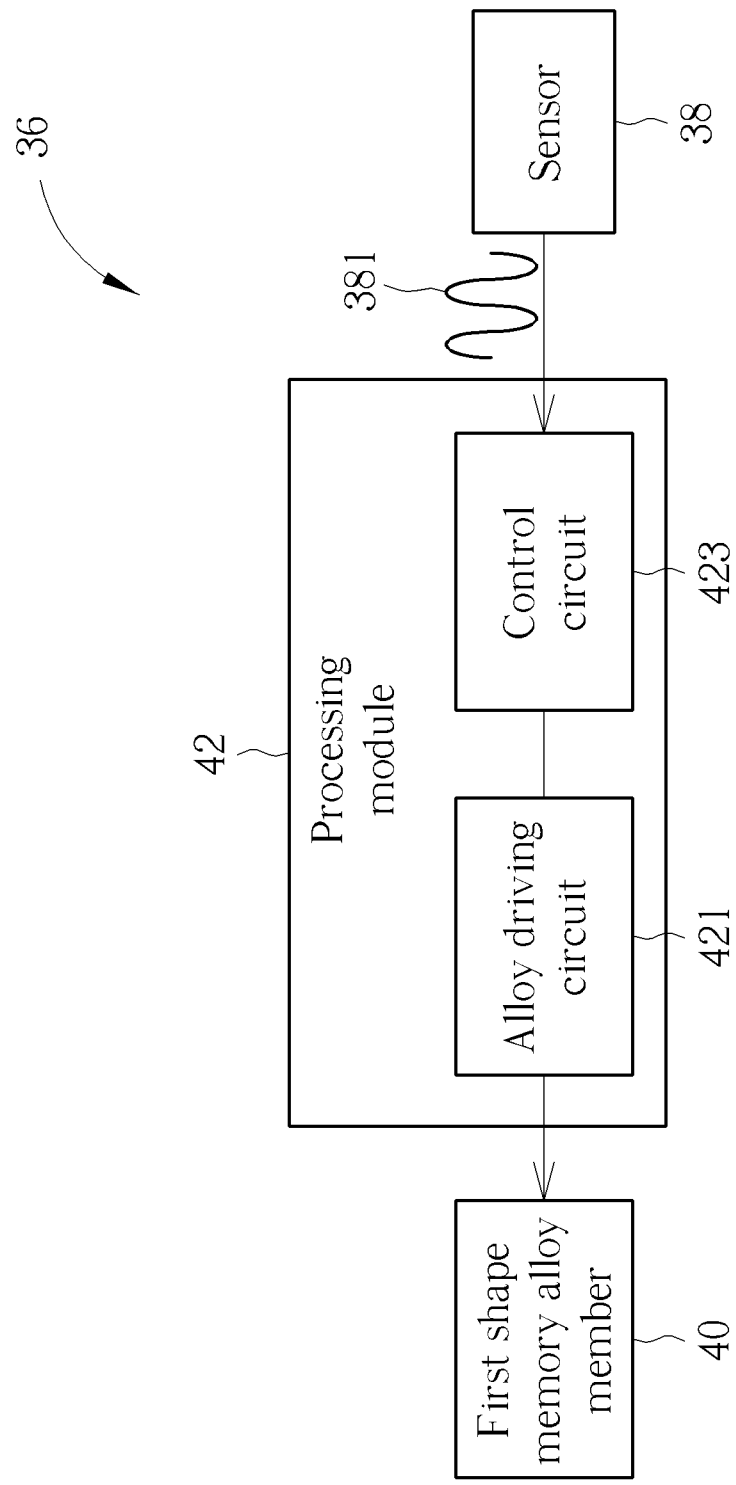
FIG. 3 is a functional block diagram of a driving system according to the first embodiment of the present invention.

Please refer to FIG. 1 to FIG. 3. FIG. 3 is a functional block diagram of the driving system 36 according to the first embodiment of the present invention. As shown in FIG. 1 to FIG. 3, the driving system 36 includes a sensor 38 installed on the housing 32 and for generating a first sensing signal 381. In this embodiment, the sensor 38 is a pressure sensor, such that the user is capable of touching the pressure sensor (i.e. the sensor 38) for generating the first sensing signal 381. In addition, the driving system 36 further includes a first shape memory alloy (SMA) member 40 and a processing module 42. The first SMA member 40 connects the first module 34 and the housing 32, and the processing module 42 is coupled to the sensor 38 and the first SMA member 40. In this embodiment, the first SMA member 40 is made of SMA material. As a result, when the first SMA member 40 is heated, the crystal lattice of the first SMA member 40 will transform. For example, the crystal lattice of the first SMA member 40 can transform from low-temperature martensite into high-temperature austenite, such that shape memory effect of the first SMA member 40 occurs. Accordingly, a length of the first SMA member 40 changes from a shortened status as being in low temperature to a stretched status as being in high temperature due to shape memory effect. In other words, the length of the first SMA member 40 can be increased in this embodiment.

Furthermore, the processing module 42 can include an alloy driving circuit 421 and a control circuit 423. The alloy driving circuit 421 is coupled to the first SMA member 40, and the control circuit 423 is coupled to the sensor 38 and the alloy driving circuit 421, as shown in FIG. 3. In addition, the driving system 36 further includes two first recovery members 44 respectively connected to the first module 34 and the housing 32. An amount and disposal positions of the first recovery member 44 of the present invention are not limited to those illustrated in figures in this embodiment. For example, the driving system 36 can include only one first recovery member 44 as well, i.e. structures of the driving system 36 including at least one first recovery member 44 are within the scope of the present invention.

More detailed descriptions for principle of the driving system 36 are provided as follows. When the first module 34 is desired to be expanded out of the housing 32 of the electronic device 30, the sensor 38 is touched to generate the first sensing signal 381. Afterwards, when the control circuit 423 of the processing module 42 receives the first sensing signal 381 from the sensor 38, the control circuit 423 of the processing module 42 controls the alloy driving circuit 421 to supply power to the first SMA member 40 for heating the first SMA member 40. When the first SMA member 40 is heated, the first SMA member 40 will deform due to the shape memory effect. In this embodiment, the first SMA member 40 deforms to increase the length of the first SMA member 40, so as to drive the first module 34 to move away from the housing 32 to the expanding position along a first direction X1, as shown in FIG. 1. In other words, the first SMA member 40 can be used for driving the first module 34 to be expanded out of the housing 32. Furthermore, when the first module 34 is no longer in use, the first recovery member 44 drives the first module 34 to move close to the housing 32 from the expanding position shown in FIG. 1 to the containing position shown in FIG. 2 along a second direction X2 opposite to the first direction X1. In other words, the first recovery member 44 can be used for driving the first module 34 to move toward the housing 32, so as to contain the first module 34 inside the housing 32.

In this embodiment, the electronic device 30 is a smart phone equipped with a touch panel, not shown in figures, and the sensor 38 is a pressure sensor combined with the touch panel. Furthermore, the first module 34 is a keyboard module, and the first recovery member 44 is a spring. As mentioned above, when the keyboard module (i.e. the first module 34) is desired to be in use, the sensor 38 (i.e. the pressure sensor) combined with the touch panel is utilized for generating the first sensing signal 381, such that the processing module 42 controls the first SMA member 40 to drive the keyboard module (i.e. the first module 34) to be expanded out of the housing 32. Accordingly, the user can operate the keyboard module (i.e. the first module 34) in a key-in manner, such as keying in a phone number, a text, a message and so on. When the keyboard module (i.e. the first module 34) is not in use, the spring (i.e. the first recovery member 44) can drive the keyboard module (i.e. the first module 34) to recover for containing the keyboard module (i.e. the first module 34) inside the housing 32. As a result, the appearance unity of the smart phone (i.e. the electronic device 30) can be kept. Implementation of the first module 34 of the present invention is not limited to those mentioned in this embodiment. For example, the first module 34 can be an antenna module or a speaker module as well. As for which one of the above-mentioned designs is adopted, it depends on practical demands.

Figure 4:
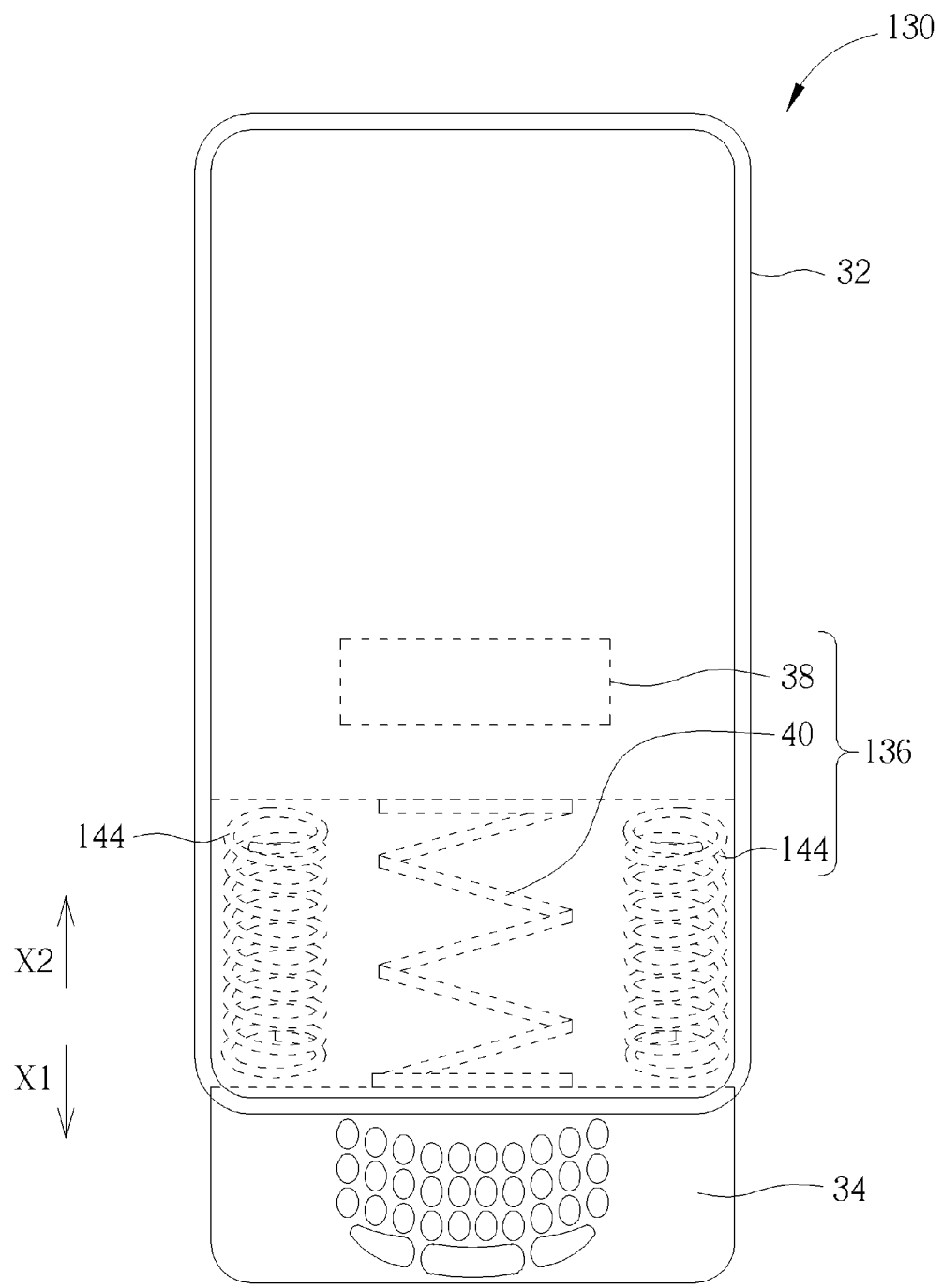
FIG. 4 is a diagram of an electronic device in an expanded status according to a second embodiment of the present invention.
Figure 5:
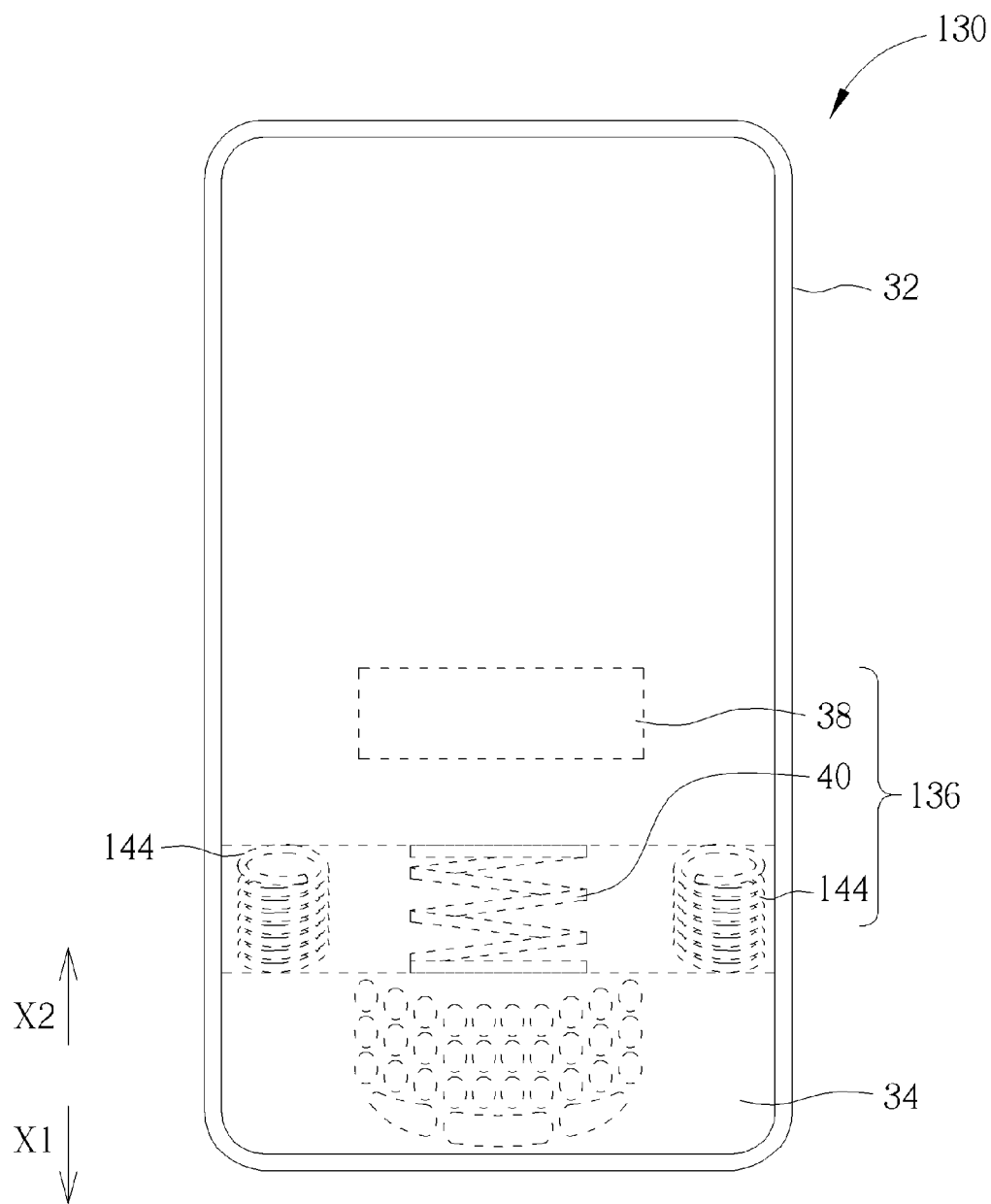
FIG. 5 is a diagram of the electronic device in a contained status according to the second embodiment of the present invention.
Figure 6:
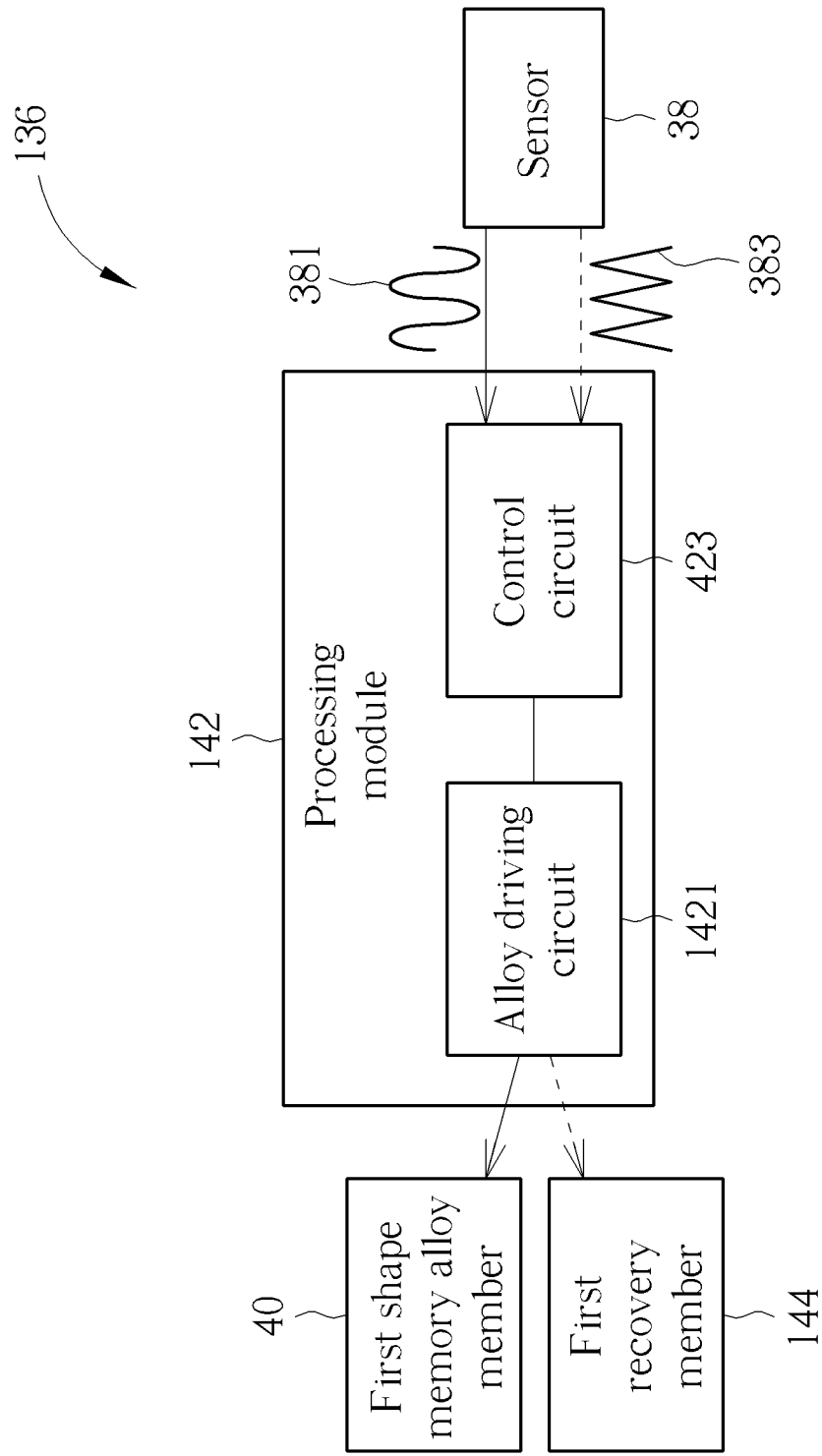
FIG. 6 is a functional block diagram of a driving system according to the second embodiment of the present invention.

Please FIG. 4 to FIG. 6. FIG. 4 is a diagram of an electronic device 130 in an expanded status according to a second embodiment of the present invention. FIG. 5 is a diagram of the electronic device 130 in a contained status according to the second embodiment of the present invention. FIG. 6 is a functional block diagram of a driving system 136 according to the second embodiment of the present invention. As shown in FIG. 4 to FIG. 6, the main difference between the electronic device 130 and the aforesaid electronic device 30 is that two first recovery members 144 of the driving system 136 of the electronic device 130 are respectively made of SMA material, and the sensor 38 of the electronic device 130 is further for generating a second sensing signal 383. Furthermore, an alloy driving circuit 1421 of a processing module 142 of the electronic device 130 is coupled to the first SMA member 40 and the first recovery members 144.

When the first module 34 is desired to be expanded out of the housing 32 of the electronic device 130, the sensor 38 is touched to generate the first sensing signal 381. Afterwards, when the control circuit 423 of the processing module 142 receives the first sensing signal 381 from the sensor 38, the control circuit 423 of the processing module 142 controls the alloy driving circuit 1421 to supply power to the first SMA member 40 for heating the first SMA member 40. When the first SMA member 40 is heated, the first SMA member 40 will deform due to the shape memory effect. In this embodiment, the first SMA member 40 deforms to increase the length of the first SMA member 40, so as to drive the first module 34 to move away from the housing 32 to the expanding position along the first direction X1, as shown in FIG. 4. In other words, the first SMA member 40 can be used for driving the first module 34 to be expanded out of the housing 32.

Furthermore, when the first module 34 is desired to be contained, the sensor 38 is further touched to generate the second sensing signal 383. Afterwards, when the control circuit 423 of the processing module 142 receives the second sensing signal 383 from the sensor 38, the control circuit 423 of the processing module 142 controls the alloy driving circuit 1421 to supply power to the first recovery members 144 for heating the first recovery members 144. When the first recovery members 144 are heated, the first recovery members 144 will deform due to the shape memory effect. In this embodiment, the first recovery members 144 deform to decrease the length of the first recovery members 144. Accordingly, the first recovery members 144 can drive the first module 34 to move close to the housing 32 from the expanding position shown in FIG. 4 to a containing position shown in FIG. 5 along the second direction X2 opposite to the first direction X1. In other words, the first recovery members 144 can be used for driving the first module 34 to move toward the housing 32 by utilizing the shape memory effect, so as to contain the first module 34 in the housing 32.

In this embodiment, the stress generated by the deforming first recovery members 144 as being heated is greater than the stress generated by the deforming first SMA member 40 as being heated. As a result, when the first recovery members 144 are heated to deform, the stress generated by the first recovery members 144 is capable of overcoming the stress generated by the first SMA member 40. Accordingly, the first recovery members 144 are capable of pulling the first module 34 to recover from the expanding position shown in FIG. 4 to the containing position shown in FIG. 6 along the second direction X2, so as to contain the first module 34 in the housing 32. In this embodiment, the first recovery member 144 is a spring structure. The spring structure can increase deformation of the first recovery member 144 along the second direction X2, so as to increase a distance that the first recovery members 144 pull the first module 34. Accordingly, the first module 34 can be completely contained in the housing 32.

It should be noticed that the driving system 136 can include only one sensor 38 for generating the first sensing signal 381 and the second sensing signal 383. An amount of the sensor 38 of the driving system 136 is not limited to those illustrated in figures in this embodiment. For example, the driving system 136 can include two sensors 38 as well for generating the first sensing signal 381 and the second sensing signal 383, respectively. In other words, structures of the driving system 136 including at least one sensor 38 are within the scope of the present invention. Components with denoted in this embodiment identical to those in the aforesaid embodiment have identical structures and functions, and further description is omitted herein for simplicity.

Figure 7:
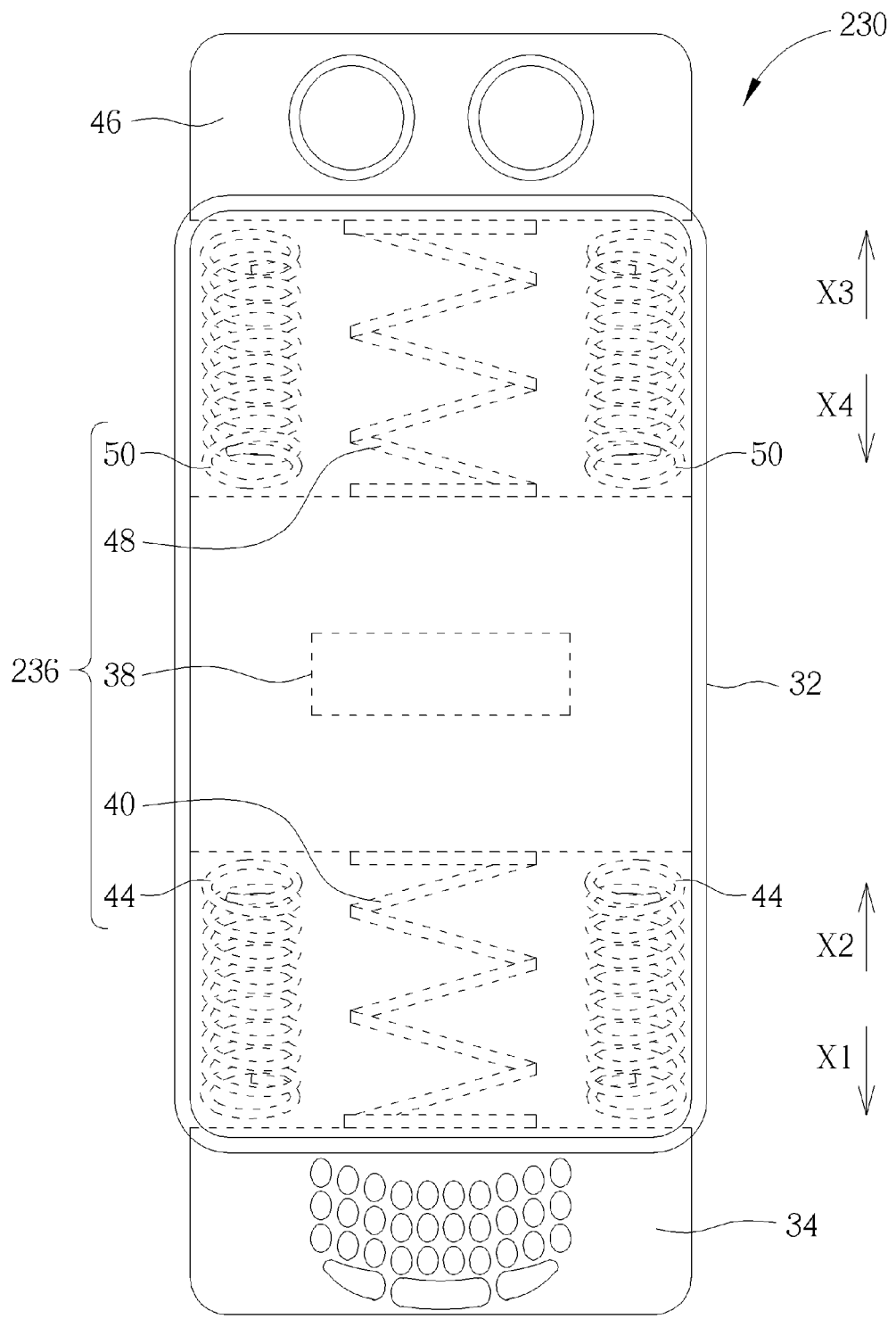
FIG. 7 is a diagram of an electronic device according to a third embodiment of the present invention.
Figure 8:
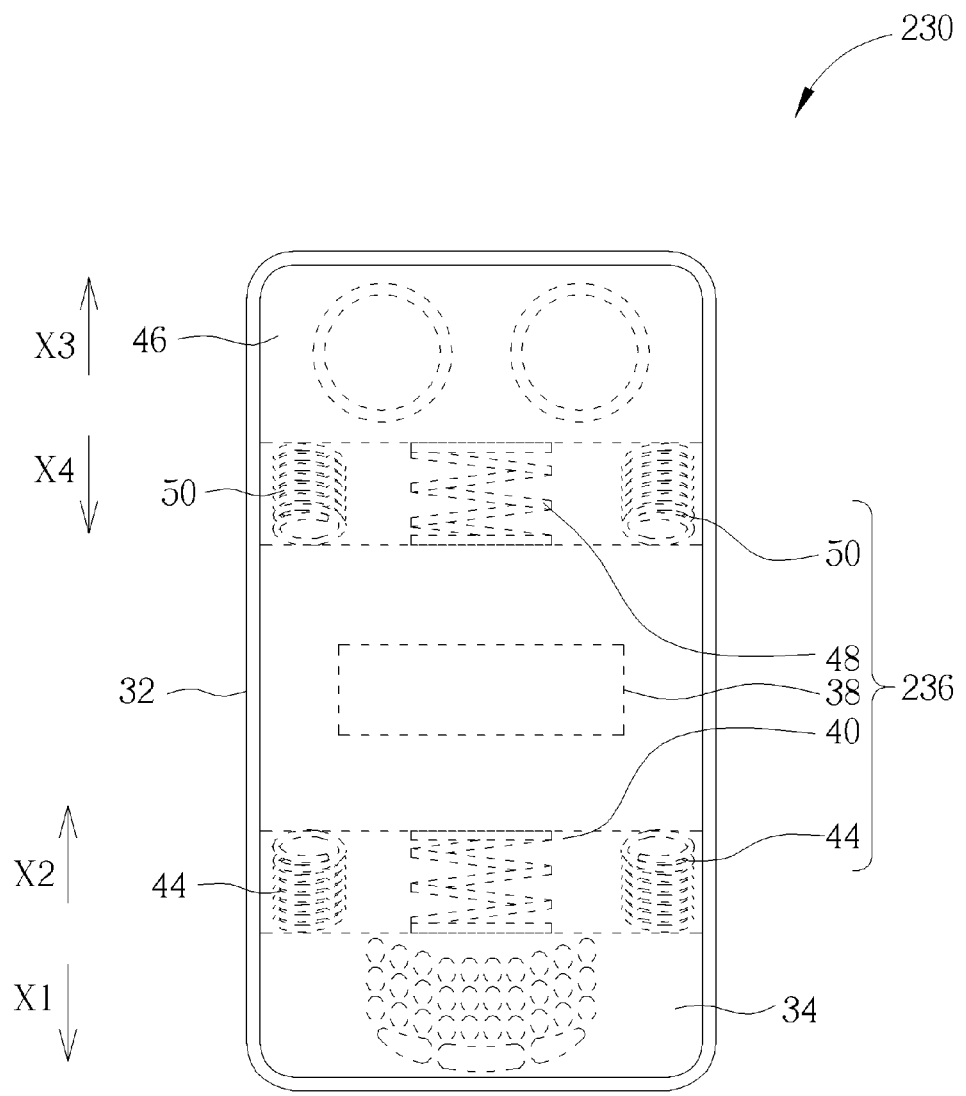
FIG. 8 is a diagram of the electronic device in another status according to the third embodiment of the present invention.
Figure 9:
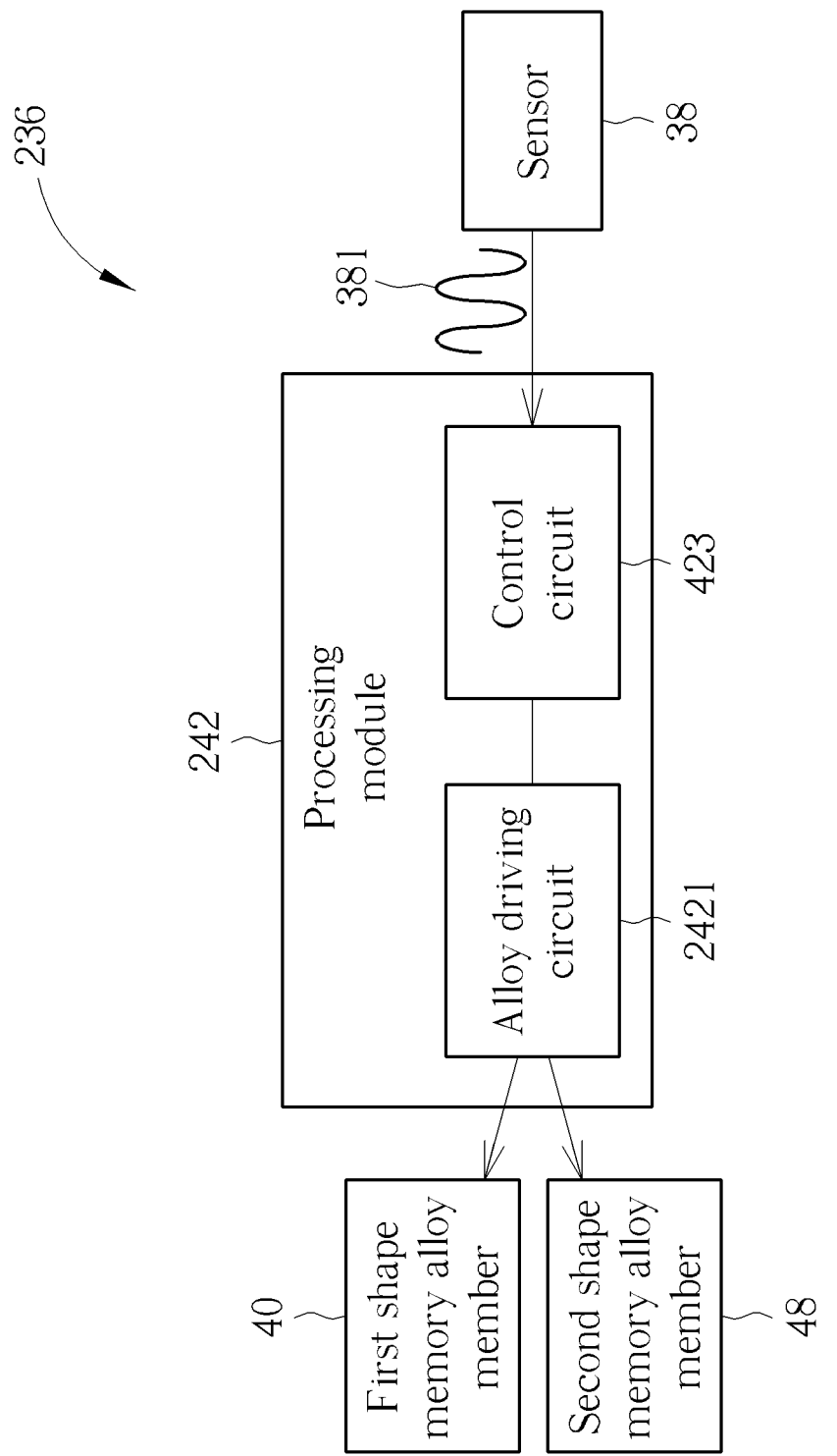
FIG. 9 is a functional block diagram of a driving system according to the third embodiment of the present invention.

Please refer to FIG. 7 to FIG. 9. FIG. 7 is a diagram of an electronic device 230 according to a third embodiment of the present invention. FIG. 8 is a diagram of the electronic device 230 in another status according to the third embodiment of the present invention. FIG. 9 is a functional block diagram of a driving system 236 according to the third embodiment of the present invention. As shown in FIG. 7 to FIG. 9, the main difference between the electronic device 230 and the aforesaid electronic device 30 is that the electronic device 230 further includes a second module 46 and the driving system 236 of the electronic device 230 is further for driving the second module 46 to move relative to the housing 32. Furthermore, the driving system 236 further includes a second SMA member 48 and two second recovery members 50. Both of the second SMA member 48 and the two second recovery members 50 connect the second module 46 and the housing 32, and an alloy driving circuit 2421 of the processing module 242 of the driving system 236 is coupled to the first SMA member 40 and the second SMA member 48.

When the first module 34 and the second module 46 are desired to be expanded out of the housing 32 of the electronic device 230, the sensor 38 is touched to generate the first sensing signal 381. Afterwards, when the control circuit 423 of the processing module 242 receives the first sensing signal 381 from the sensor 38, the control circuit 423 of the processing module 242 controls the alloy driving circuit 2421 to supply power to the first SMA member 40 and the second SMA member 48 for heating the first SMA member 40 and the second SMA member 48. When the first SMA member 40 is heated, the first SMA member 40 will deform due to the shape memory effect. In this embodiment, the first SMA member 40 deforms to increase the length of the first SMA member 40, so as to drive the first module 34 to move away from the housing 32 to an expanding position along the first direction X1, as shown in FIG. 7. When the second SMA member 48 is heated, the second SMA member 48 will deform due to the shape memory effect. In this embodiment, the second SMA member 48 deforms to increase the length of the second SMA member 48, so as to drive the second module 46 to move away from the housing 32 to a using position along the a third direction X3, as shown in FIG. 7. As mentioned above, the first SMA member 40 and the second SMA member 48 can be used for driving the first module 34 and the second module 46 to be expanded out of the housing 32, respectively.

Furthermore, when the first module 34 and the second module 46 are no longer in use, the first recovery member 44 drives the first module 34 to move close to the housing 32 from the expanding position shown in FIG. 7 to a containing position shown in FIG. 8 along the second direction X2 opposite to the first direction X1, and the second recovery members 50 drives the second module 46 to move close to the housing 32 from the using position shown in FIG. 7 to a retracting position shown in FIG. 8 along the fourth direction X4 opposite to the third direction X3. In other words, the first recovery member 44 can be used for driving the first module 34 to move toward the housing 32, so as to contain the first module 34 inside the housing 32, and the second recovery members 50 can be used for driving the second module 46 to move toward the housing 32, so as to contain the second module 46 inside the housing 32.

In this embodiment, the first module 34 is a keyboard module, the second module 46 is an antenna module or a speaker module, and the first recovery member 44 and the second recovery member 50 are respectively a spring. Furthermore, the first module 34 and the second module 46 are disposed on two opposite sides of the housing 32, respectively. Disposal positions of the first module 34 and the second module 46 are not limited to those illustrated in figures in this embodiment. For example, the first module 34 and the second module 46 can be respectively disposed on two adjacent sides of the housing 32 as well. As for which one of the aforesaid designs is adopted, it depends on practical demands. Components with denoted in this embodiment identical to those in the aforesaid embodiment have identical structures and functions, and further description is omitted herein for simplicity.

Figure 10:
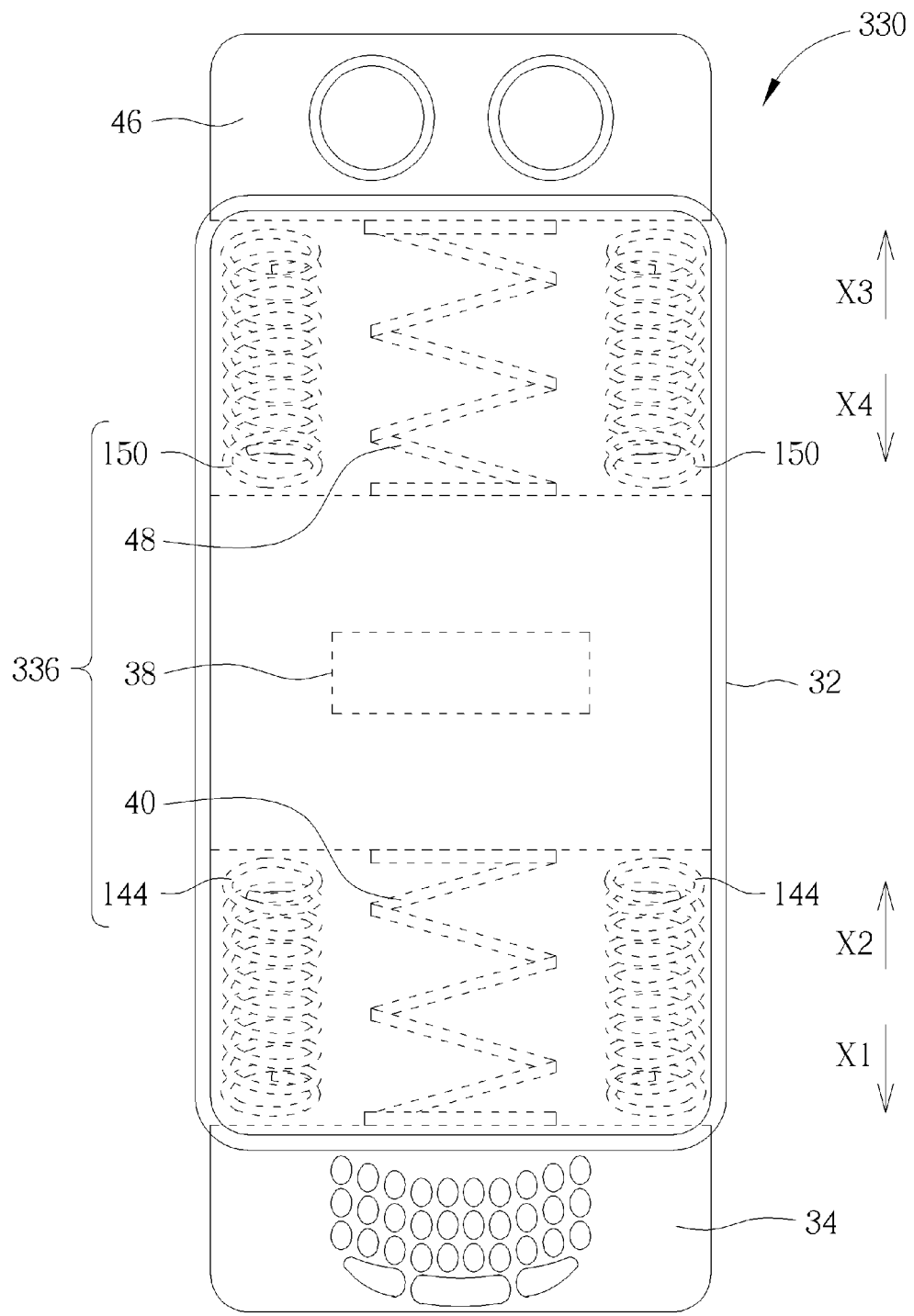
FIG. 10 is a diagram of an electronic device according to a fourth embodiment of the present invention.
Figure 11:
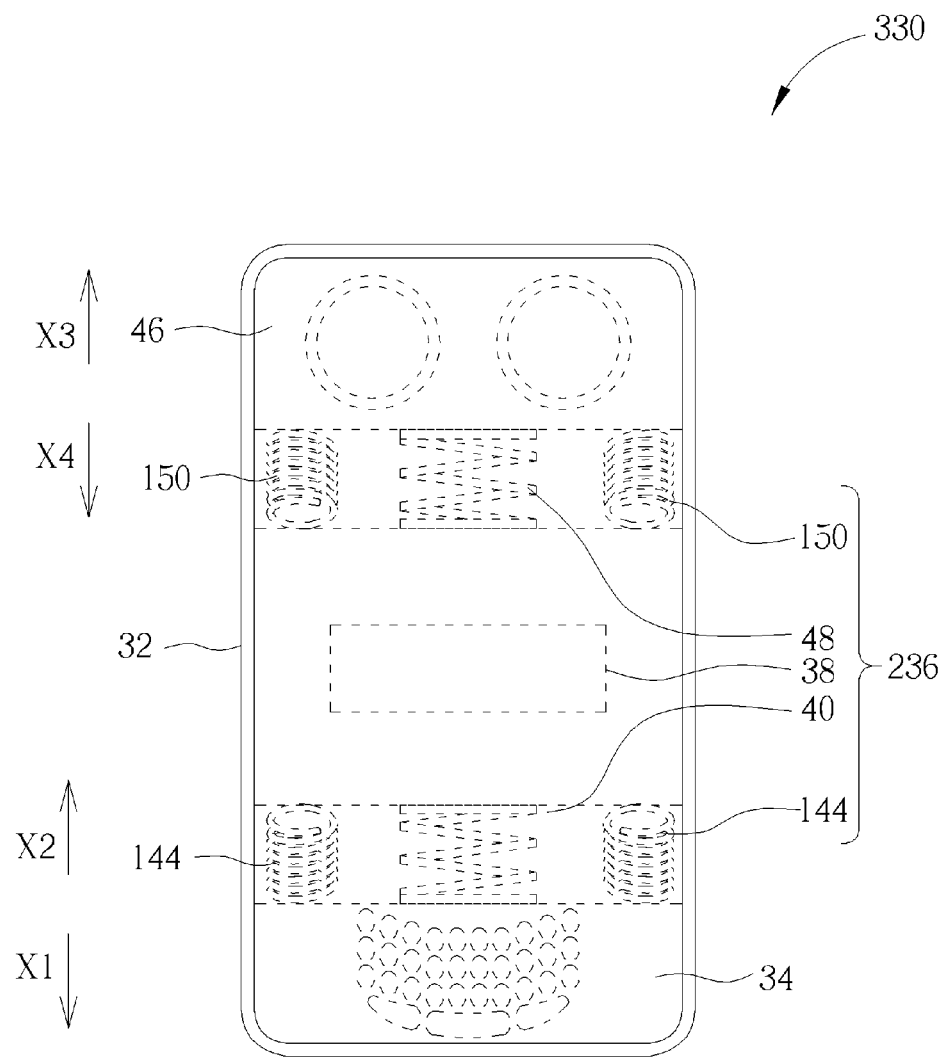
FIG. 11 is a diagram of the electronic device in another status according to the fourth embodiment of the present invention.
Figure 12:
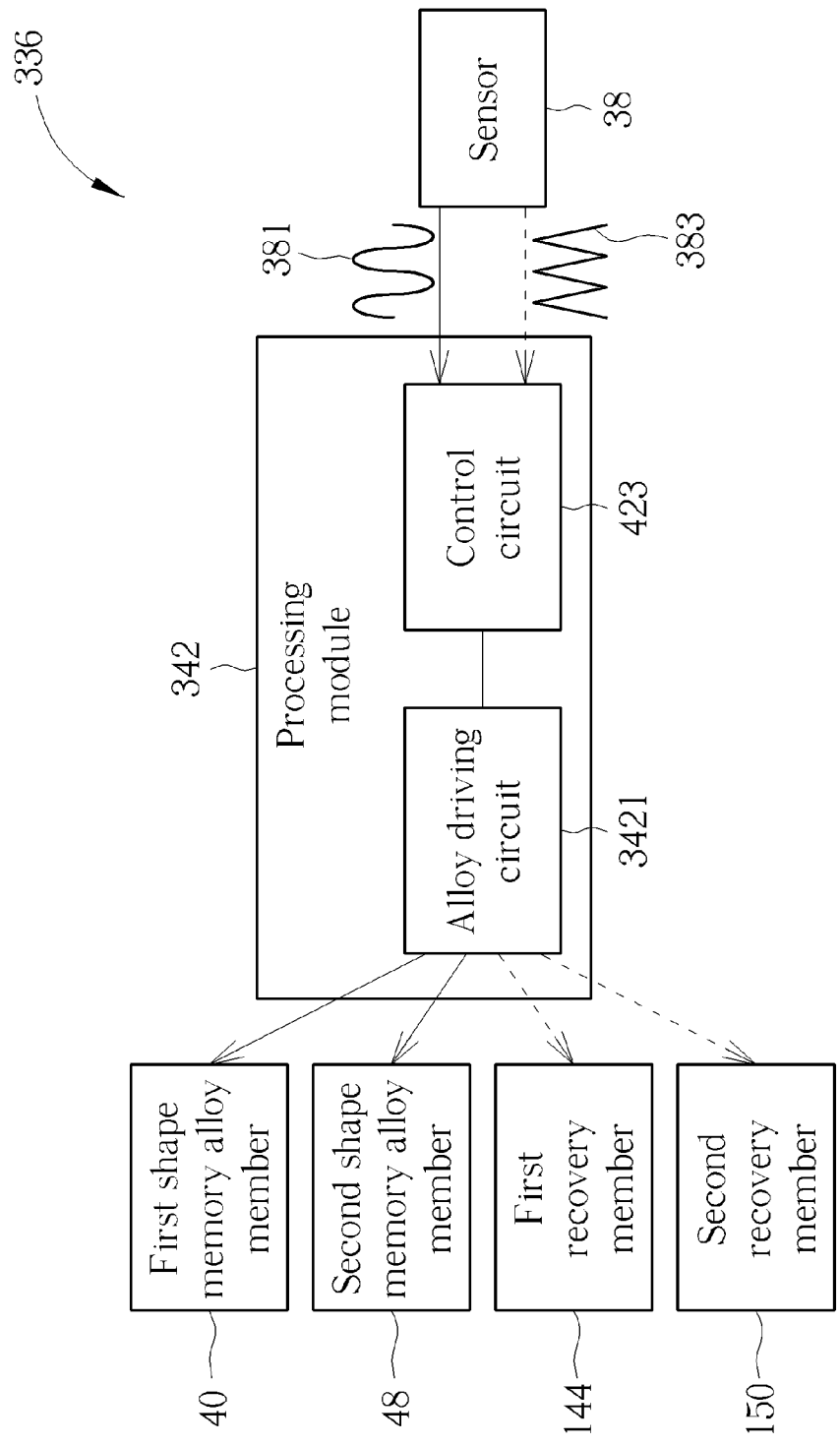
FIG. 12 is a functional block diagram of a driving system according to the fourth embodiment of the present invention.

Please FIG. 10 to FIG. 12. FIG. 10 is a diagram of an electronic device 330 according to a fourth embodiment of the present invention. FIG. 11 is a diagram of the electronic device 330 in another status according to the fourth embodiment of the present invention. FIG. 12 is a functional block diagram of a driving system 336 according to the fourth embodiment of the present invention. As shown in FIG. 10 to FIG. 12, the main difference between the electronic device 330 and the aforesaid electronic device 230 is that two first recovery members 144 and two second recovery members 150 of the driving system 336 of the electronic device 330 are respectively made of SMA material, and the sensor 38 of the electronic device 330 is further for generating a second sensing signal 383. Furthermore, an alloy driving circuit 3421 of a processing module 342 of the electronic device 330 is coupled to the first SMA member 40, the second SMA member 48, the first recovery members 144 and the second recovery members 150.

When the first module 34 and the second module 46 are desired to be expanded out of the housing 32 of the electronic device 330, the sensor 38 is touched to generate the first sensing signal 381. Afterwards, when the control circuit 423 of the processing module 342 receives the first sensing signal 381 from the sensor 38, the control circuit 423 of the processing module 342 controls the alloy driving circuit 3421 to supply power to the first SMA member 40 and the second SMA member 48 for heating the first SMA member 40 and the second SMA member 48. When the first SMA member 40 is heated, the first SMA member 40 will deform due to the shape memory effect. In this embodiment, the first SMA member 40 deforms to increase the length of the first SMA member 40, so as to drive the first module 34 to move away from the housing 32 to an expanding position along the first direction X1, as shown in FIG. 10. When the second SMA member 48 is heated, the second SMA member 48 will deform due to the shape memory effect. In this embodiment, the second SMA member 48 deforms to increase the length of the second SMA member 48, so as to drive the second module 46 to move away from the housing 32 to a using position along the third direction X3, as shown in FIG. 10. As mentioned above, the first SMA member 40 and the second SMA member 48 can be used for driving the first module 34 and the second module 46 to be expanded out of the housing 32, respectively.

Furthermore, when the first module 34 and the second module 46 are desired to be contained, the sensor 38 is further touched to generate the second sensing signal 383. Afterwards, when the control circuit 423 of the processing module 342 receives the second sensing signal 383 from the sensor 38, the control circuit 423 of the processing module 342 controls the alloy driving circuit 3421 to supply power to the first recovery members 144 and the second recovery members 150 for heating the first recovery members 144 and the second recovery members 150. When the first recovery members 144 are heated, the first recovery members 144 will deform due to the shape memory effect. In this embodiment, the first recovery members 144 deform to decrease the length of the first recovery members 144. Accordingly, the first recovery members 144 can drive the first module 34 to move close to the housing 32 from the expanding position shown in FIG. 10 to a containing position shown in FIG. 11 along the second direction X2 opposite to the first direction X1. In other words, the first recovery members 144 can be used for driving the first module 34 to move toward the housing 32 by utilizing the shape memory effect, so as to contain the first module 34 in the housing 32. When the second recovery members 150 are heated, the second recovery members 150 will deform due to the shape memory effect. In this embodiment, the second recovery members 150 deform to decrease the length of the second recovery members 150. Accordingly, the second recovery members 150 can drive the second module 46 to move close to the housing 32 from the using position shown in FIG. 10 to a retracting position shown in FIG. 11 along the fourth direction X4 opposite to the third direction X3. In other words, the second recovery members 150 can be used for driving the second module 46 to move toward the housing 32 by utilizing the shape memory effect, so as to contain the second module 46 in the housing 32.

In this embodiment, the stress generated by the deforming first recovery members 144 as being heated is greater than the stress generated by the deforming first SMA member 40 as being heated. As a result, when the first recovery members 144 are heated to deform, the stress generated by the first recovery members 144 is capable of overcoming the stress generated by the first SMA member 40. Accordingly, the first recovery members 144 are capable of pulling the first module 34 to recover from the expanding position shown in FIG. 10 to the containing position shown in FIG. 11 along the second direction X2. Similarly, the stress generated by the deforming second recovery members 150 as being heated is greater than the stress generated by the deforming second SMA member 48 as being heated. As a result, when the second recovery members 150 are heated to deform, the stress generated by the second recovery members 150 is capable of overcoming the stress generated by the second SMA member 48. Accordingly, the second recovery members 150 are capable of pulling the second module 46 to recover from the using position shown in FIG. 10 to the retracting position shown in FIG. 11 along the fourth direction X4.

In this embodiment, the first recovery member 144 and the second recovery member 150 are respectively a spring structure. The spring structure can increase deformation of the first recovery member 144 along the second direction X2 and deformation of the second recovery member 150 along the fourth direction X4. In such a manner, a distance that the first recovery members 144 pull the first module 34 can be increased for completely containing the first module 34 in the housing 32, and a distance that the second recovery members 150 pull the second module 46 can be increased for completely containing the second module 46 in the housing 32.

It should be noticed that the driving system 336 can include only one sensor 38 for generating the first sensing signal 381 and the second sensing signal 383. An amount of the sensor 38 of the driving system 336 is not limited to those illustrated in figures in this embodiment. For example, the driving system 336 can include two sensors 38 as well for generating the first sensing signal 381 and the second sensing signal 383, respectively. In other words, structures of the driving system 336 including at least one sensor 38 are within the scope of the present invention. Components with denoted in this embodiment identical to those in the aforesaid embodiment have identical structures and functions, and further description is omitted herein for simplicity.

Compared to the prior art, since the SMA member of the present invention deforms as being heated, the SMA member of the present invention can utilized for driving a module (e.g. the keyboard module) to be expanded out of the housing of the electronic device. As a result, the user can operate the expanded module. When the module is no longer in use, the present invention further utilizes the recovery member for driving the module to be contained in the housing of the electronic device, so as to keep the appearance unity of the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving system for driving a first module to move relative to a housing, comprising:
    at least one sensor installed on the housing and for generating a first sensing signal;
    a first shape memory alloy (SMA) member connecting the first module and the housing;
    a processing module coupled to the at least one sensor and the first SMA member, the processing module supplying power to the first SMA member for heating the first SMA member when receiving the first sensing signal from the at least one sensor, such that the first SMA member deforms to drive the first module to move away from the housing to an expanding position along a first direction; and
    at least one first recovery member connecting the first module and the housing, the at least one first recovery member being separate from the first SMA and for driving the first module to move toward the housing so as to be in a containing position along a second direction opposite to the first direction, wherein the first direction and the second direction are straight.

2. The driving system of claim 1, wherein the at least one first recovery member is made of SMA material, the at least one sensor is for generating a second sensing signal, and the processing module supplies power to the at least one first recovery member for heating the at least one first recovery member when receiving the second sensing signal from the at least one sensor, such that the at least one first recovery member deforms and drives the first module to move toward the housing so as to be in the containing position.

3. The driving system of claim 2, wherein the processing module comprises:
    an alloy driving circuit coupled to the first SMA member and the at least one first recovery member; and a control circuit coupled to the at least one sensor and the alloy driving circuit, the control circuit controlling the alloy driving circuit to supply power to the first SMA member when receiving the first sensing signal from the at least one sensor, the control circuit controlling the alloy driving circuit to supply power to the at least one first recovery member when receiving the second sensing signal from the at least one sensor.

4. The driving system of claim 2, wherein the at least one first recovery member is a spring-shaped structure.

5. The driving system of claim 1, wherein the at least one first recovery member is a spring.

6. The driving system of claim 5, wherein the processing module comprises:
an alloy driving circuit coupled to the first SMA member; and
a control circuit coupled to the at least one sensor and the alloy driving circuit, and the control circuit controlling the alloy driving circuit to supply power to the first SMA member when receiving the first sensing signal from the at least one sensor.

7. The driving system of claim 1, further for driving a second module to move relative to the housing, further comprising:
a second SMA member connecting the second module and the housing, the processing module supplying power to the second SMA member for heating the second SMA member when receiving the first sensing signal from the at least one sensor such that the second SMA member deforms and drives the second module to move away from the housing so as to be in a using position; and
at least one second recovery member connecting the second module and the housing for driving the second module to move toward the housing so as to be in a retracting position.

8. The driving system of claim 7, wherein the at least one first recovery member and the at least one second recovery member are made of SMA material, the at least one sensor is for generating a second sensing signal, the processing module supplies power to the at least one first recovery member and the at least one second recovery member for heating the at least one first recovery member and the at least one second recovery member when receiving the second sensing signal from the at least one sensor such that the at least one first recovery member deforms and drives the first module to move toward the housing so as to be in the containing position, and the at least one second recovery member deforms and drives the second module to move toward the housing so as to be in the retracting position.

9. The driving system of claim 8, wherein the processing module comprises:
an alloy driving circuit coupled to the first SMA member, the second SMA member, the at least one first recovery member and the at least one second recovery member; and
a control circuit coupled to the at least one sensor and the alloy driving circuit, the control circuit controlling the alloy driving circuit to supply power to the first SMA member and the second SMA member when receiving the first sensing signal from the at least one sensor, the control circuit controlling the alloy driving circuit to supply power to the at least one first recovery member and the at least one second recovery member when receiving the second sensing signal from the at least one sensor.

10. The driving system of claim 8, wherein the at least one first recovery member and the at least one second recovery member are respectively a spring-shaped structure.

11. The driving system of claim 7, wherein the at least one first recovery member and the at least one second recovery member are respectively a spring.

12. The driving system of claim 11, wherein the processing module comprises:
an alloy driving circuit coupled to the first SMA member and the second SMA member; and
a control circuit coupled to the at least one sensor and the alloy driving circuit, the control circuit controlling the alloy driving circuit to supply power to the first SMA member and the second SMA member when receiving the first sensing signal from the at least one sensor.

13. An electronic device, comprising:
a housing;
a first module; and
a driving system for driving the first module to move relative to the housing, comprising:
at least one sensor installed on the housing and for generating a first sensing signal;
a first shape memory alloy member (SMA) connecting the first module and the housing;
a processing module coupled to the at least one sensor and the first SMA member, the processing module supplying power to the first SMA member for heating the first SMA member when receiving the first sensing signal from the at least one sensor, such that the first SMA member deforms to drive the first module to move away from the housing to an expanding position along a first direction; and
at least one first recovery member connecting the first module and the housing, the at least one first recovery member being separate from the first SMA and for driving the first module to move toward the housing so as to be in a containing position along a second direction opposite to the first direction, wherein the first direction and the second direction are straight.

14. The electronic device of claim 13, wherein the at least one first recovery member is made of SMA material, the at least one sensor is for generating a second sensing signal, and the processing module supplies power to the at least one first recovery member for heating the at least one first recovery member when receiving the second sensing signal from the at least one sensor, such that the at least one first recovery member and drives the first module to move toward the housing so as to be in the containing position.

15. The electronic device of claim 14, wherein the at least one first recovery member is a spring-shaped structure, and the processing module comprises:
an alloy driving circuit coupled to the first SMA member and the at least one first recovery member; and
a control circuit coupled to the at least one sensor and the alloy driving circuit, the control circuit controlling the alloy driving circuit to supply power to the first SMA member when receiving the first sensing signal from the at least one sensor, the control circuit controlling the alloy driving circuit to supply power to the at least one first recovery member when receiving the second sensing signal from the at least one sensor.

16. The electronic device of claim 13, wherein the at least one first recovery member is a spring, and the processing module comprises:
an alloy driving circuit coupled to the first SMA member; and a control circuit coupled to the at least one sensor and the alloy driving circuit, and the control circuit controlling the alloy driving circuit to supply power to the first SMA member when receiving the first sensing signal from the at least one sensor.

17. The electronic device of claim 13, further comprising a second module, the driving system being further for driving the second module to move relative to the housing and comprising:
- a second SMA member connecting the second module and the housing, the processing module supplying power to the second SMA member for heating the second SMA member when receiving the first sensing signal from the at least one sensor such that the second SMA member deforms and drives the second module to move away from the housing so as to be in a using position; and
- at least one second recovery member connecting the second module and the housing for driving the second module to move toward the housing so as to be in a retracting position.

18. The electronic device of claim 17, wherein the at least one first recovery member and the at least one second recovery member are made of SMA material, the at least one sensor is for generating a second sensing signal, the processing module supplies power to the at least one first recovery member and the at least one second recovery member for heating the at least one first recovery member and the at least one second recovery member when receiving the second sensing signal from the at least one sensor such that the at least one first recovery member deforms and drives the first module to move toward the housing so as to be in the containing position, and the at least one second recovery member deforms and drives the second module to move toward the housing so as to be in the retracting position.

19. The electronic device of claim 18, wherein the processing module comprises:
- an alloy driving circuit coupled to the first SMA member, the second SMA member, the at least one first recovery member and the at least one second recovery member; and
- a control circuit coupled to the at least one sensor and the alloy driving circuit, the control circuit controlling the alloy driving circuit to supply power to the first SMA member and the second SMA member when receiving the first sensing signal from the at least one sensor, the control circuit controlling the alloy driving circuit to supply power to the at least one first recovery member and the at least one second recovery member when receiving the second sensing signal from the at least one sensor.

20. The electronic device of claim 13, wherein the first module is a keyboard module, and the second module is an antenna module or a speaker module.

* * * * *